(12) United States Patent
Hanks et al.

(10) Patent No.: US 8,949,668 B2
(45) Date of Patent: Feb. 3, 2015

(54) METHODS AND SYSTEMS FOR USE IN IDENTIFYING ABNORMAL BEHAVIOR IN A CONTROL SYSTEM INCLUDING INDEPENDENT COMPARISONS TO USER POLICIES AND AN EVENT CORRELATION MODEL

(75) Inventors: Carl J. Hanks, St. Louis, MO (US); Steven A. Dorris, O'Fallon, MO (US); Arun Ayyagari, Seattle, WA (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 13/113,529

(22) Filed: May 23, 2011

(65) Prior Publication Data

US 2012/0304007 A1    Nov. 29, 2012

(51) Int. Cl.
| | | |
|---|---|---|
| *G06F 11/00* | (2006.01) | |
| *G06F 11/30* | (2006.01) | |
| *H04L 29/08* | (2006.01) | |
| *G06F 21/55* | (2013.01) | |
| *H04L 29/06* | (2006.01) | |
| *H04L 29/14* | (2006.01) | |
| *G05B 23/02* | (2006.01) | |

(52) U.S. Cl.
CPC ............. *H04L 67/12* (2013.01); *G06F 21/554* (2013.01); *H04L 63/1416* (2013.01); *H04L 69/40* (2013.01); *G05B 23/0216* (2013.01); *G05B 23/0229* (2013.01)
USPC .............. 714/26; 714/47.1; 714/47.2; 714/48

(58) Field of Classification Search
USPC .......... 714/26, 48, 47.1, 47.2; 706/14, 15, 16, 706/25, 45
See application file for complete search history.

(56) References Cited

U.S. PATENT DOCUMENTS

| | | | |
|---|---|---|---|
| 6,601,048 B1 | 7/2003 | Gavan et al. | |
| 7,362,229 B2 * | 4/2008 | Brinton et al. ............. | 340/572.1 |
| 2005/0055223 A1 * | 3/2005 | Khosla ............................. | 705/1 |
| 2007/0118545 A1 | 5/2007 | Chandrasekharan et al. | |
| 2008/0270328 A1 | 10/2008 | Lafferty et al. | |
| 2009/0312880 A1 * | 12/2009 | Venturini Cheim et al. .. | 700/292 |
| 2010/0131446 A1 * | 5/2010 | Firminger et al. ............. | 706/46 |
| 2011/0099602 A1 * | 4/2011 | Apparao et al. .................. | 726/1 |
| 2012/0284211 A1 * | 11/2012 | Datta et al. ...................... | 706/11 |

FOREIGN PATENT DOCUMENTS

JP        2009070071 A      4/2009

OTHER PUBLICATIONS

Wikipedia's Object Oriented Programming version from Apr. 30, 2011 http://en.wikipedia.org/w/index.php?title=Object-oriented_programming&oldid=426706884.*
Combined Search and Examination Report for Application No. GB1208390.3; Aug. 31, 2012; 6 pages.
Wikipedia Contributors, Complex Event Processing, May 5, 2011, 5 pages, Page Version ID: 427572606, Wikipedia, The Free Encyclopedia.

* cited by examiner

*Primary Examiner* — Joseph Schell
(74) *Attorney, Agent, or Firm* — Armstrong Teasdale LLP (57) ABSTRACT

Methods and apparatus for use in identifying abnormal behavior in a control system. Operating events associated with a control system are received, and an actual behavior of the control system is determined based on the received operating events. The actual behavior is compared to expected behavior to determine whether the actual behavior differs from the expected behavior. The expected behavior includes a correlation between a plurality of operating events associated with the control system. The expected behavior is updated based on an indication of whether the actual behavior is abnormal from a user.

17 Claims, 4 Drawing Sheets

METHODS AND SYSTEMS FOR USE IN IDENTIFYING ABNORMAL BEHAVIOR IN A CONTROL SYSTEM INCLUDING INDEPENDENT COMPARISONS TO USER POLICIES AND AN EVENT CORRELATION MODEL

BACKGROUND

The field of the disclosure relates generally to control systems and, more specifically, to methods and systems for use in determining whether actual system behavior is abnormal.

At least some known control systems compare actual behavior to expected behavior based on static, preconfigured rules to determine whether the actual behavior is abnormal. For example, an abnormal condition may be recognized when the rotational velocity of a machine exceeds a preconfigured maximum rotational velocity.

However, such known systems are generally limited to monitoring operating events that are internal to the controlled apparatus. Further, the use of static, preconfigured rules may provide only coarse or gross thresholds that are generally applicable to a class of system and may therefore not support evaluation based on fine thresholds that are specific to a particular system.

BRIEF DESCRIPTION

In one aspect, a method for identifying abnormal behavior in a control system is provided. The method includes receiving, by a computing device, a plurality of operating events associated with a control system. The operating events represent at least one physical operating event. An actual behavior of the control system is determined by the computing device based on the operating events. The actual behavior is compared to an expected behavior by the computing device to determine whether the actual behavior differs from the expected behavior. The expected behavior includes a correlation between a plurality of operating events associated with the control system. An indication of whether the actual behavior is abnormal is received from a user by the computing device when the actual behavior differs from the expected behavior, and the expected behavior is updated by the computing device based on the received indication.

In another aspect, a system for use in identifying abnormal behavior in a control system. The system includes a storage device, a communications unit, and a processor unit coupled to the storage device and the communications unit. The storage device is configured to store an expected behavior associated with a control system. The expected behavior includes a correlation between a plurality of operating events. The communications unit is configured to receive a plurality of operating events representing at least one physical operating event associated with the control system. The processor unit is programmed to determine an actual behavior of the control system based on the operating events, to compare the actual behavior to the expected behavior to determine whether the actual behavior differs from the expected behavior, and to update the expected behavior based on an indication from a user of whether the actual behavior is abnormal.

In yet another aspect, one or more computer readable media having computer-executable components are provided. The components include an event processor component, a complex event processing component, a machine learning component, and a decision support component. When executed by at least one processor unit, the event processor component causes the at least one processor unit to receive a plurality of operating events including one or more physical operating events associated with a control system. When executed by at least one processor unit, the complex event processing component causes the at least one processor to compare an actual behavior that is based on the operating events to an expected behavior that is based on one or more user-defined policies to determine whether the actual behavior differs from the expected behavior. When executed by at least one processor unit, the machine learning component causes the at least one processor unit to compare the actual behavior to an artificial intelligence event correlation model that is based on a plurality of past operating events to determine whether the actual behavior differs from the expected behavior. When executed by at least one processor unit, the decision support component causes the at least one processor unit to transmit an abnormal behavior notification when the actual behavior differs from the expected behavior.

The features, functions, and advantages that have been discussed can be achieved independently in various embodiments or may be combined in yet other embodiments further details of which can be seen with reference to the following description and drawings.

DETAILED DESCRIPTION

The described embodiments are directed to determining whether events in a control system indicate abnormal behavior using a combination of complex event processing (CEP) based on user-defined policies and machine learning based on past events.

The behavior of a control system may be monitored by a monitoring device using static, preconfigured rules that define various threshold values. In such a scenario, only violations of such threshold values may trigger action by the monitoring device. Accordingly, the detection of and reaction to abnormal circumstances that do not result in a threshold violation, whether connected with a network or an end system, may be limited by human perception and correlative ability. Embodiments described herein provide both dynamic, machine-based configuration and human management implemented via policy, enabling a monitoring device to ensure that systems are operating normally and resources are utilized most effectively while still providing much needed human oversight.

Complex event processing (CEP) may be used to consume and process multiple streams of events, or time stamped records of activity (e.g., operating conditions and/or commands) in the system. The collection of events available as input to a CEP system may be referred to as an "event cloud." Using pattern detection, abstraction and modeling, the CEP system may process many events and select the most meaningful events from the event cloud. These events are analyzed for relationships and causality, eventually culminating in the realization of complex events. CEP systems may determine the impact of such events and determine corrective actions based on a predetermined policy.

In some embodiments, control system monitoring is implemented in a gateway device that serves as the nexus of multiple networks. Messages passing through the gateway may be utilized as a source of events. In addition to messages, a gateway system may provide additional event data, such as environmental changes, link status changes, and other gateway-recognizable developments. Using a set of event correlation rules, the cloud of events is processed, correlated and refined into complex events. The resulting complex events flow into a processing engine that uses user defined policy to determine actions to take based on the occurrence of events. Due to the central nature of the gateway, all attached and internal systems may receive actions from the processing engine including actions for data movement, caching, radio or network configuration, and data transformation. Network performance and system awareness can be enhanced by using the gateway to perceive real-time events and take appropriate actions.

Embodiments are described herein with reference to computing devices. A computing device may include a peer router, an end-user device, and/or an embedded device. A computing device may operate as an intrusion detection system, such as by executing network sensor software (e.g., syslog-ng) that may be used to trap and/or monitor network activity associated with specific computing devices that may include operations such as deep packet inspection and performing cyber analytics on the data communication streams for the specifically identified computing devices. Such a computing device may also perform policy and access control driven traffic policing for the particular computing device based on the results of the cyber analytics. This approach to distributed data traffic monitoring and analysis allows for more precise traffic policing closer to the origin of the particular data dissemination source, potentially limiting the impact of adverse cyber security related networking effects and the propagation of such effects to the core and the network. The computing devices can employ complex event processing (CEP) and machine learning to perform cyber security analytics such as causal chain analysis and detection of anomalies and correlations to identify data traffic streams and associated computing devices that may require monitoring and policing for a novel distributed firewall implementation.

Internet routers perform aggregated network traffic forwarding and/or routing. With ubiquitous Internet access, these forwarding/routing paths may be susceptible to manipulation for entities to gain access to network traffic for both real-time and offline traffic analysis and denial of service (DoS) attacks. Applying the methods described herein, adjacent (e.g., peer-to-peer) routers may classify the network traffic they are forwarding to each other and estimate the data latency characteristics for each of the network traffic classifications. This estimate of the data characteristics may be estimated, for example, based on a dynamic sliding window, such that the calculated latency adapts to the changing traffic profile based on factors such as diurnal patterns and potential failure in the backbone/trunk networking infrastructure. While the transition in the network traffic profiles for diurnal patterns is relatively gradual, updates to the network topology and packet forwarding path may cause a relatively more rapid change. Under circumstances when the Internet network infrastructure is operating normally, one may not expect drastic changes in the forwarding/routing paths between routers. Accordingly, the adjacent peer-to-peer routers may detect a deviation in the network traffic characteristics between the two routers for one or more network traffic classes that is beyond the baseline acceptable range and, in response, trigger an alert to one or more network management entities (e.g., monitoring systems and/or personnel) and/or execute one or more predetermined mitigation operations to limit the potential adverse impact, such as by limiting the transmission rate of a particular class of network traffic or, in an extreme scenario, completely blocking the class of network traffic or rerouting the class of network traffic via an alternate path. The alerting and/or notification mechanism to monitor, detect, and arrive at the decision can employ CEP and machine learning for cyber security analytics, such as causal chain analysis and/or detection of anomalies and correlations to identify data traffic streams characteristics and policy driven autonomous network management decisions and/or actions.

Figure 1:
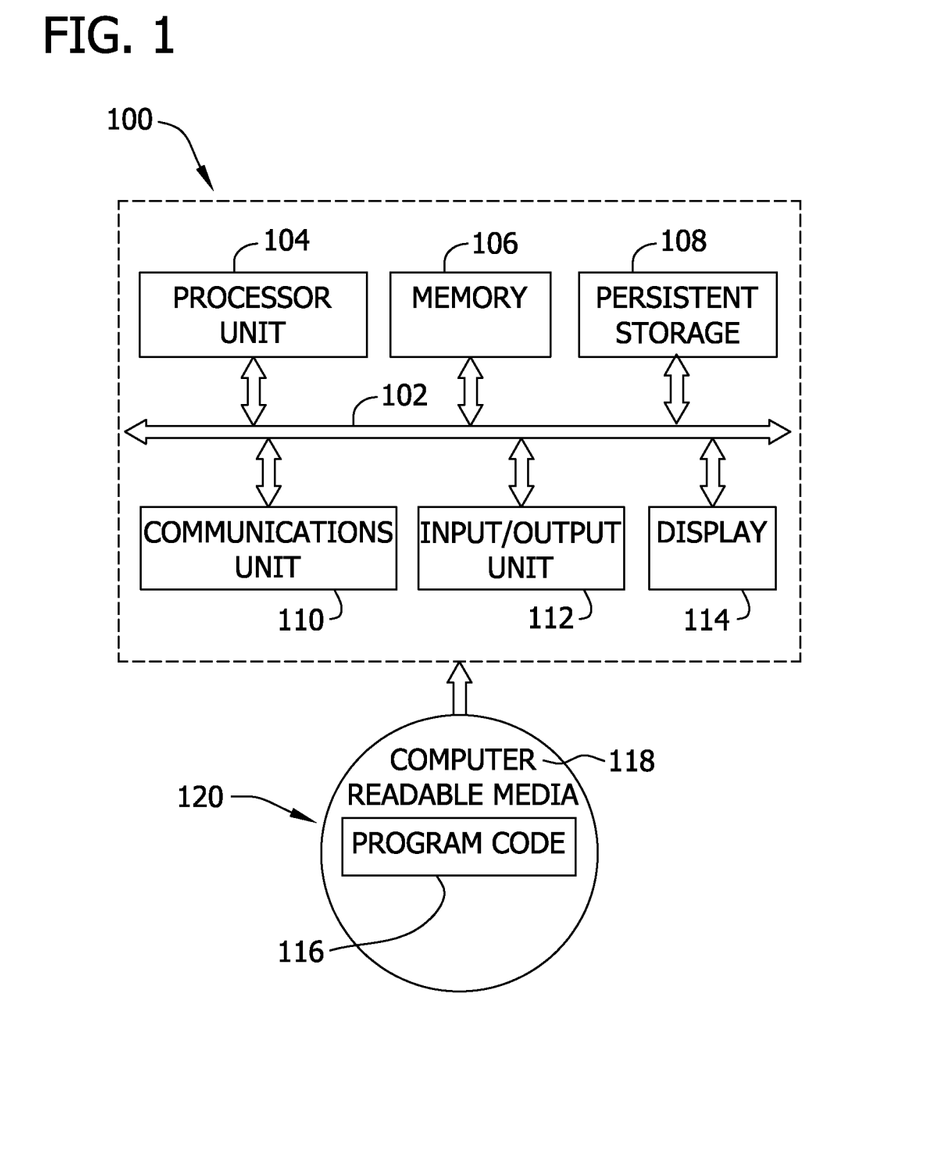
FIG. 1 is a block diagram of an exemplary computing device.

FIG. 1 is a block diagram of an exemplary computing device 100. In the exemplary embodiment, computing device 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory 106 and persistent storage 108 are examples of storage devices. As used herein, a storage device is any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., event processor components, complex event processing components, machine learning components, and decision support components), data received from data sources, events, user-defined policies, artificial intelligence (AI) event correlation models, and/or any other information suitable for use with the methods described herein.

Communications unit 110, in these examples, provides for communications with other computing devices or systems. In the exemplary embodiment, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include an event processor component, a complex event processing component, a machine learning component, a decision support component, and/or any component suitable for the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
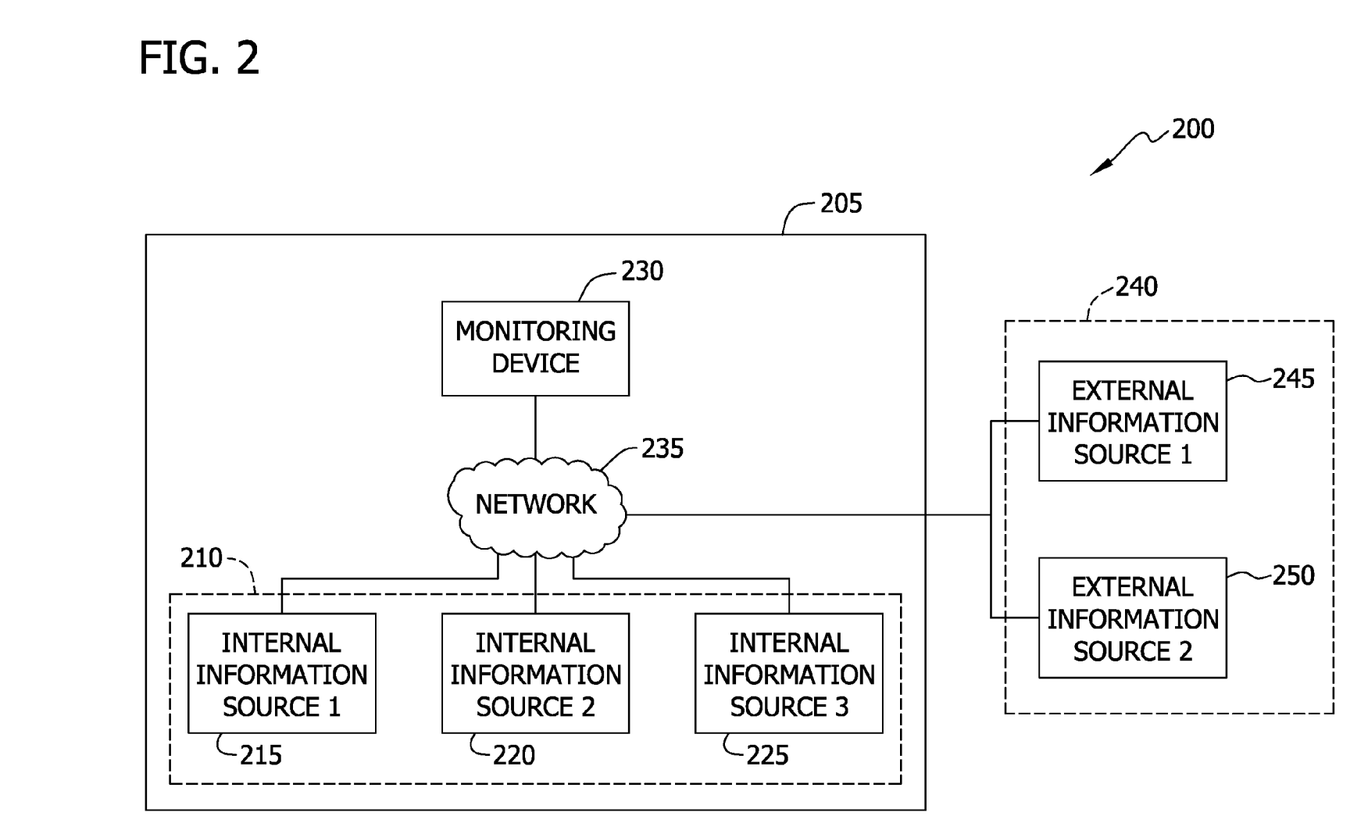
FIG. 2 is a block diagram illustrating an exemplary system for use in identifying abnormal behavior in a control system.

FIG. 2 is a block diagram illustrating an exemplary system 200 for use in identifying abnormal behavior in a control system 205. Control system 205 includes internal information sources 210, such as a first internal information source 215, a second internal information source 220, and a third internal information source 225, and a monitoring device 230 that are coupled in communication via a network 235. Also coupled to monitoring device 230 via network 235 are external information sources 240, such as a first external information source 245 and a second external information source 250. Internal information sources 210, external information sources 240, and monitoring device 230 may be separate examples of computing device 100 (shown in FIG. 1) and/or may be integrated with each other.

Internal information sources 210 and external information sources 240 may include, without limitation, equipment controllers, facility monitors, web servers, application servers, database servers, web service providers, Really Simple Syndication (RSS) feed servers, and/or any provider of data that may be used with the methods described herein.

In some embodiments, monitoring device 230 is a gateway that facilitates communication among and between internal information sources 210 and external information sources 240. In such embodiments, monitoring device 230 may receive from an external information source 240 a message directed to an internal information source 210. Monitoring device 230 translates the message, if necessary, and forwards the message to the appropriate internal information source 210. Monitoring device 230 may further evaluate and/or store the message as an incoming event associated with control system 205.

Figure 3:
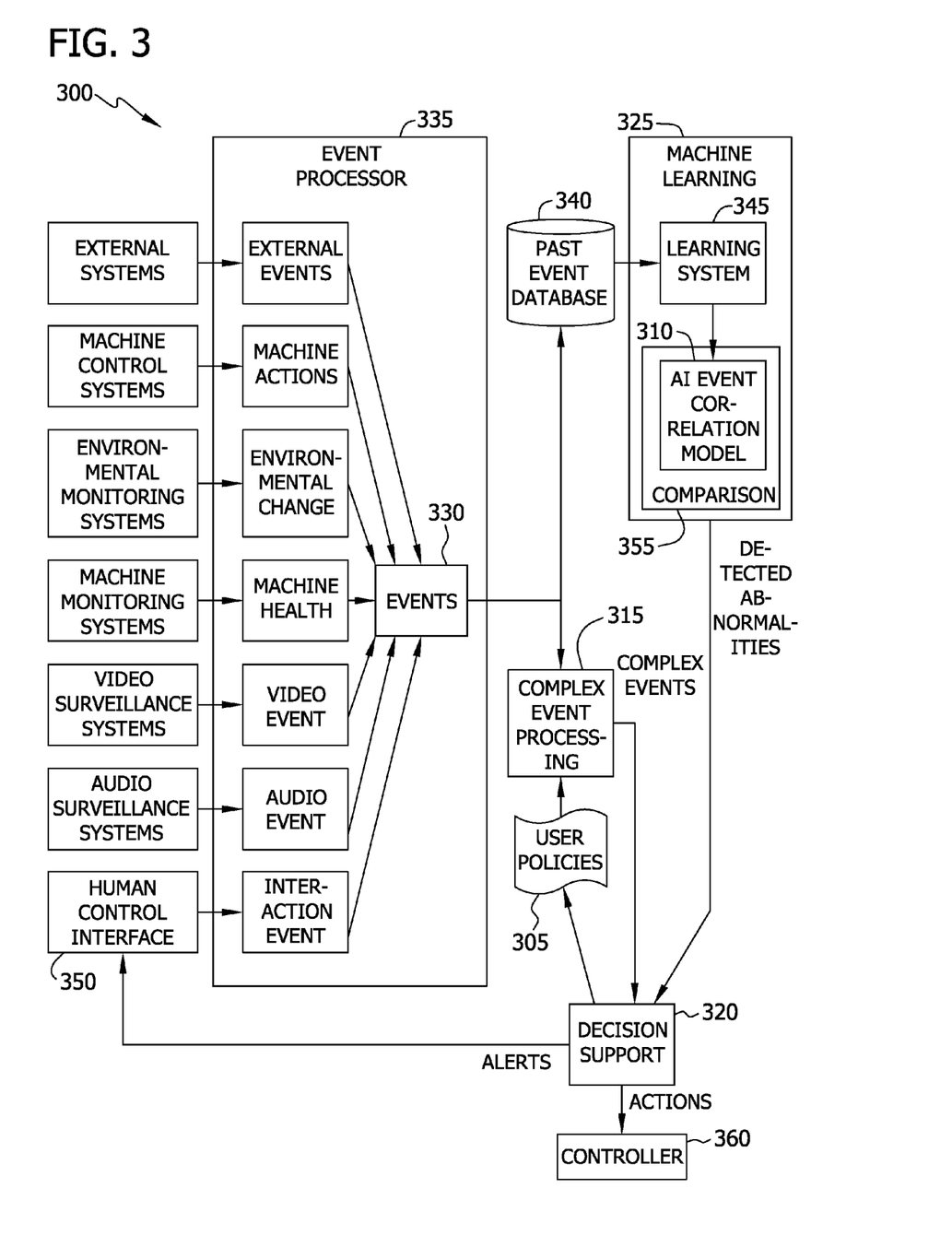
FIG. 3 is a block diagram illustrating executable components that may be used with the system shown in FIG. 2.
Figure 4:
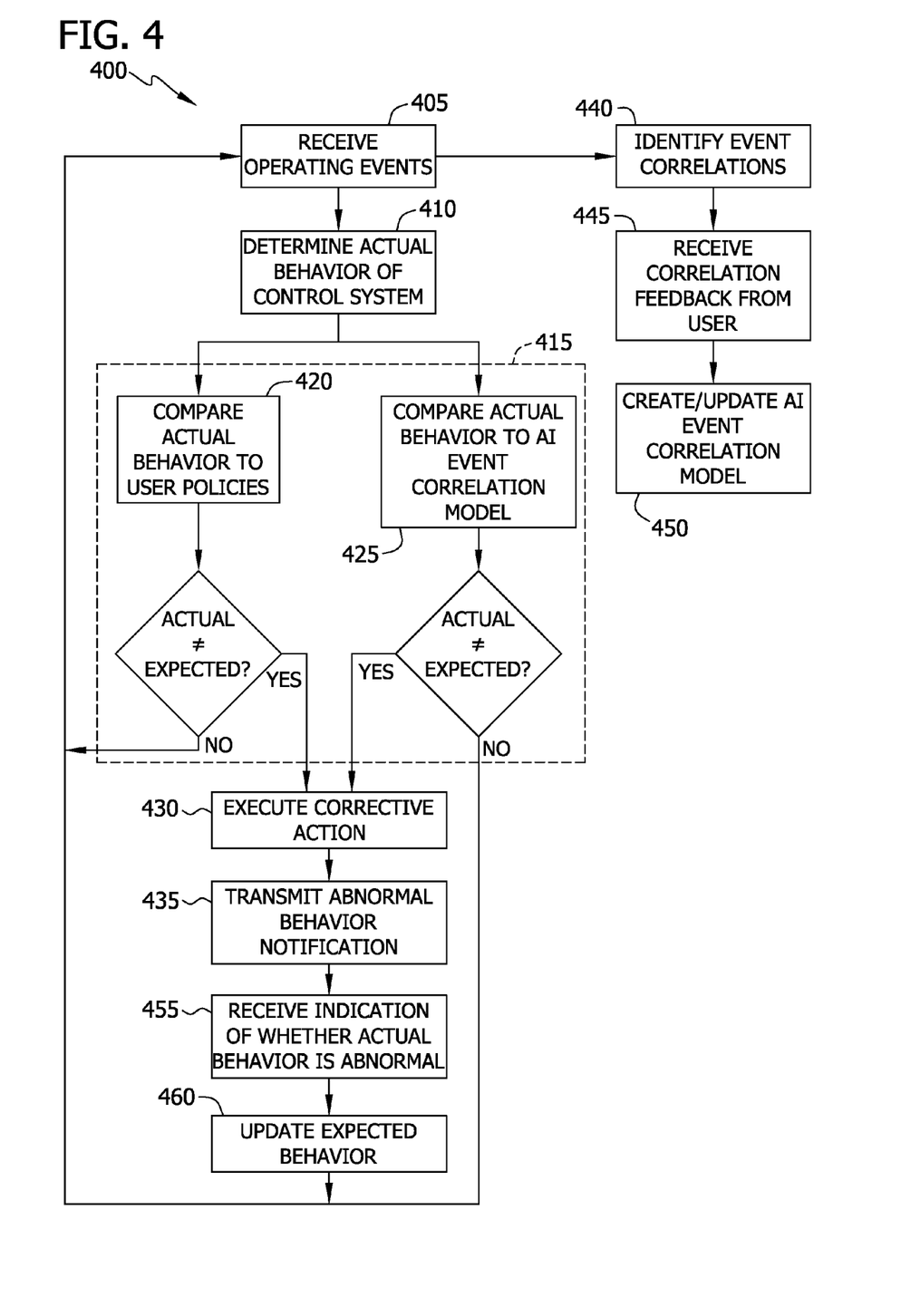
FIG. 4 is a flowchart of an exemplary method that may be used with the system shown in FIG. 2.

FIG. 3 is a block diagram 300 illustrating executable components that may be used with system 200 (shown in FIG. 2). FIG. 4 is a flowchart of an exemplary method 400 that may be used with system 200. In exemplary embodiments, one or more operations included in method 400 are performed by a computing device 100 (shown in FIG. 1), such as monitoring device 230 (shown in FIG. 2).

Referring to FIGS. 2, 3, and 4, in exemplary embodiments, method 400 facilitates evaluating actual behavior of control system 205 with respect to expected behavior that is represented by user policies 305 and an artificial intelligence (AI) event correlation model 310. In some embodiments, user policies 305 include rules that associate operating events with threshold values. During operation of control system 205, abnormal behavior may be detected when such a threshold value is violated.

A threshold value may be expressed as a minimum value or a maximum value. A maximum threshold value is considered violated when an operating event has a value greater than the maximum threshold value. A minimum threshold value is considered violated when an operating event has a value less than the minimum threshold value.

As described in more detail below, AI event correlation model 310 includes one or more correlations between a plurality of operating events during normal operation of control system 205. For example, such correlations may include an expected sequence and/or timing of operating events.

In exemplary embodiments, control system 205 is a supervisory control and data acquisition (SCADA) system, and one or more internal information sources 210 and/or external information sources 240 may include a SCADA controller. A SCADA system may be implemented in an industrial environment on any scale, such as part of a small factory or an entire electrical grid.

In some embodiments, monitoring device 230 operates as a gateway, providing translation between protocols used by different systems (e.g., internal information sources 210 and/or external information sources 240). By incorporating the operations of monitoring device 230 in a translation gateway, increased capabilities may be achieved. In exemplary embodiments, a complex event processing (CEP) component 315 is used to correlate diverse events from real time event flows to predict system faults. CEP component 315 may recognize correlated events, such as electrical surges and/or weather conditions, that lead to repetitive system faults and take actions prescribed by user policies 305. Should a fault occur or be predicted to occur, CEP component 315 may ensure that there is sufficient diagnostic data available for the system by increasing the monitoring frequency of the faulty system and/or by reconfiguring the quality of service parameters of network 235. CEP component 315 may cache diagnostic data in persistent storage and/or perform any actions prescribed by the applicable policy. Moreover, CEP component 315 may alert a human operator of the operating events that will likely result in a fault with the affected machine(s).

As SCADA systems increase in scope and prevalence, they may be targeted by various attacks at an increasing rate. New attack threats may be difficult to detect via signature because the signature for the threat is unknown. If the threat is not a variant of a previous threat, heuristics may be ineffective. Further, system corruption may be difficult to detect because threats can hide themselves via rootkits. For example, malicious software may hide executable code placed on a programmable logic controller (PLC) by replacing an existing library of executable code (e.g., a dynamically linked library) used to interface with the PLC with a modified version of the library. The modified version of the library may hide evidence of changes to the PLC by intercepting commands that might reveal its presence. Accordingly, infection may be difficult and/or impossible to detect by conventional means.

In exemplary embodiments, method 400 facilitates detecting abnormal system behavior by monitoring a large set of system parameters from diverse sources. Further, in some embodiments, monitoring device 230 operates as a gateway, routing communication between devices connected to network 235. Monitoring device 230 may therefore be in a position to both detect and combat the attacks described above.

Monitoring device 230 receives periodic sensor readings from equipment health monitoring systems, status updates from a networked machine controller, and information from external sensors such as audio, video, weather, temperature, time of year and time of day. By combining data from multiple systems, CEP component 315 can overcome situations where data from one system may be compromised. CEP component 315 may include a fraud detection system adapted to monitor gateway traffic, such as by monitoring SCADA control system traffic for disparities between reported data or other abnormal events. Once CEP component 315 has collected sufficient data, CEP component 315 may determine whether abnormalities are due to a maintenance issue, faulty sensors, or a cyber threat. Further, CEP component 315 may alert an operator to any abnormal activity or data disparities. If a cyber threat like a security breach or system compromise is detected by CEP component 315, a decision support component 320 may take protective actions (e.g., isolating and/or disabling a portion of control system 205) to guard against further damage to the SCADA system.

In exemplary embodiments, CEP component 315 evaluates received operating events based on user policies 305 that describe event flows (e.g., sequences of events) and associated actions to be taken based on such event flows. This system enables detection of system abnormalities from a large number of information sources, including the SCADA system. In order to breach system control covertly, a number of systems would have to be corrupted. In some embodiments, user policies 305 define rules relating operating events to each other and/or to threshold values. For instance, a policy may define a rule relating the state (e.g., activated or deactivated) of a controlled apparatus to power consumption. If control system 205 reports that the controlled apparatus is deactivated, but an external power monitor reports high power consumption, CEP component 315 may recognize that the rule is violated. This could indicate that system control has been corrupted and/or that there is a system failure. The policy may associate the rule with an action, such as transmitting an alert to an operator and/or disconnecting the external power from control system 205.

In exemplary embodiments, a machine learning component 325 augments CEP component 315 to detect system abnormalities outside the scope of user policies 305. Events 330 are created by an event processor component 335 from a plurality of sources and routed by event processor component 335 to both CEP component 315 and a past event database 340. Past event database 340 is accessed by a learning system 345 in machine learning component 325 to determine what normal and abnormal system behavior is, such as by identifying repeated correlations between events 330. Such identified correlations are stored in AI event correlation model 310.

In some embodiments, a human control interface 350 presents patterns or correlations identified by machine learning component and accepts positive or negative feedback from a user with respect to such correlations, allowing users to train and configure learning system 345. For example, a user may provide positive feedback to indicate that an identified correlation is representative of normal behavior or may provide negative feedback to indicate that an identified correlation is not representative of normal behavior. Similarly, the user may provide feedback to indicate whether or not an identified correlation is representative of abnormal behavior.

In exemplary embodiments, events 330 are also provided to a comparison component 355 in machine learning component 325. Comparison component 355 compares the actual behavior indicated by events 330 to the expected behavior represented by AI event correlation model 310. When unexpected patterns emerge from the event flows, the machine learning component 325 generates alerts. For example, comparison component 355 may provide detected anomalies to decision support component 320. In addition, or alternatively, detected anomalies may be provided as events to CEP component 315. User policies 305 may be constructed to use the events from machine learning component 325 to perform system actions.

Output from both CEP component 315 and machine learning component 325 are processed by decision support component 320. In exemplary embodiments, decision support component 320 executes one or more actions based on complex events from CEP component 315 and/or based on detected abnormalities from machine learning component 325. For example, decision support component 320 may instruct a controller 360 to perform a command (e.g., modifying an operation of a controlled apparatus), may isolate a potentially compromised portion of control system 205, and/or may transmit an abnormal behavior notification to a user. Such a notification may include the abnormal condition and the corrective action taken. In some embodiments, if decision support component 320 determines that no action can or should be taken, decision support component 320 transmits an abnormal behavior notification to a user, including the events detected in control system 205.

Referring specifically to block diagram 300 and method 400, in exemplary embodiments, event processor component 335 receives 405 a plurality of operating events associated with control system 205. In some embodiments, the control system is located in a physical facility, and the operating events may include one or more physical operating events, such as a measurement of a temperature, a velocity, a pressure, a power consumption, a sound pressure level, a structural load, and/or a vibration level.

Further, in some embodiments, control system 205 is associated with a controlled apparatus, such as a drill, a press, and/or an engine, which may be represented by an internal information source 210. In such embodiments, the operating events may include communication between devices, such as a control message transmitted to a control device by a controller, an internal operating event from a control device (e.g., another internal information source 210) that is configured to control an operation of the controlled apparatus, and/or an external operating event from a monitoring device (e.g., an external information source 240) that is configured to monitor an operating environment associated with the controlled apparatus. For example, operating events received from a video surveillance system may include data representing movement of a person and/or a physical object within a physical facility.

In addition, or alternatively, event processor 335 may receive 405 operating events from an intrusion detection system (IDS) and/or from an advanced persistent threat (APT) monitoring system, which may be internal information sources 210 and/or external information sources 240. For example, an IDS may be configured to monitor activity within network 235 and/or within another network (not shown), such as a local area network (LAN) and/or a wide area network (WAN) of which network 235 is a subnet.

Event processor component 335 collects events 330 from a plurality of sources and forwards events 330 to CEP component 315, past event database 340, and comparison component 355 of machine learning component 325. CEP component 315 and/or machine learning component 325 determine 410 an actual behavior of control system 205 based on events 330.

The actual behavior is compared 415 to expected behavior to determine whether the actual behavior differs from the expected behavior. In exemplary embodiments, CEP component 315 compares 420 the actual behavior to the expected behavior represented by user policies 305, and comparison component 355 compares 425 the actual behavior to the expected behavior represented by AI event correlation model 310.

In exemplary embodiments, user policies 305 include one or more event flows that are applicable to control system 205. For example, in a manufacturing system, an event flow may indicate that a product should be detected at a packaging station only after exiting an assembly station. In some embodiments, control system 205 is an instance of a class of control system, such as a standardized manufacturing system or power generator. In such embodiments, user policies 305 may include event flows that are generally applicable to the class of control system. Accordingly, each instance of the standardized control system may be operated based on the same user policies 305, at least initially. In some embodiments, user policies 305 associated with a particular instance of the control system, such as control system 205, may be adjusted based on the context (e.g., configuration, operational requirements, and/or expected usage patterns) of the instance.

When either CEP component 315 or machine learning component 325 determines that the actual behavior differs from the expected behavior, decision support component 320 is notified of the difference. In exemplary embodiments, decision support component 320 executes 430 one or more predetermined corrective actions based on the difference between actual behavior and expected behavior. For example, if the difference is identified by CEP component 315, CEP component 315 may provide to decision support component 320 one or more actions that are associated with the expected behavior in user policies 305. Similarly, if the difference is identified by machine learning component 325, machine learning component 325 may provide one or more actions that are associated with an event correlation in AI event correlation model 310. Such actions may be defined by a user, for example.

Corrective actions may include, without limitation, isolating a portion of control system 205, disabling a portion of control system 205, and/or adjusting a monitoring frequency of a portion of control system 205. In some embodiments, the portion isolated, disabled, and/or monitored is a portion of control system 205 associated with the events that were the basis for the abnormal behavior determination. In one embodiment, the operating events are initially received 405 at a first rate, and, when the actual behavior differs from the expected behavior, decision support component 320 instructs event processor component 335 to receive and log operating events at a second rate that is greater than the first rate. Such an embodiment facilitates providing a diagnostic record associated with the abnormal behavior.

In exemplary embodiments, decision support component 320 transmits 435 (e.g., to a user) an abnormal behavior notification when the actual behavior differs from the expected behavior. The abnormal behavior notification may include information describing the abnormal behavior, such as the actual behavior and/or the expected behavior. Further, if decision support component 320 has executed 430 a corrective action, the abnormal behavior notification may include the corrective action.

In exemplary embodiments, monitoring device 230 executes method 400 repeatedly (e.g., periodically, continually, or upon request) to provide ongoing monitoring of control system 205.

In exemplary embodiments, when execution of method 400 begins with respect to control system 205, AI event correlation model 310 is initialized to be empty. As past event database 340 is populated with events 330, the data available to learning system 345 increases in volume, and learning system 345 identifies 440 event correlations in past event database 340. For example, learning system 345 may identify 440 a correlation indicating that little or no movement (e.g., by physical objects and/or people) occurs in an area monitored by a video camera when a particular apparatus (e.g., a drill) is activated. Similarly, an event correlation may include a correlation between a power consumption and a state of a controlled machine. For example, learning system 345 may identify 440 a correlation indicating that the power consumption of a machine, or the current measured along a power line, is positively correlated with a rotational velocity of the machine.

In some embodiments, learning system 345 provides identified event correlations to a user (e.g., via human control interface 350) and receives 445 correlation feedback from the user. For example, the user may indicate whether an identified event correlation indicates normal (expected) behavior of control system 205. Alternatively, the user may indicate whether the identified event correlation indicates abnormal behavior of control system 205. Further, the user may specify an action to be executed 430 if the actual behavior differs from the expected behavior.

Learning system 345 creates and/or updates 450 AI event correlation model 310 based on the event correlations identified 440 and, optionally, the correlation feedback received 445. The created/updated AI event correlation model 310 represents correlations between a plurality of operating events during normal operation of control system 205. AI event correlation model 310 may be used by comparison component 355 to compare 425 actual behavior to expected behavior.

In some embodiments, human control interface 350 presents the information associated with an abnormal behavior notification and receives 455 from a user an indication of whether the actual behavior is abnormal. The expected behavior is updated 460 based on this indication. For example, if the user indicates that the actual behavior is not abnormal, the expected behavior may be updated 460 to include the actual behavior. In some embodiments, CEP component 315 and/or decision support component 320 updates user policies 305 to remove or adjust a rule (e.g., by relaxing a threshold value) when the user indicates that the actual behavior is not abnormal. Similarly, learning system 345 may update AI event correlation model 310, using the indication from the user as positive feedback or negative feedback to strengthen or weaken, respectively, an identified correlation between operating events. Further, learning system 345 may strengthen a correlation as an increasing quantity of events exhibits that correlation over time.

Although embodiments are described herein with reference to a SCADA system, such as an industrial control system, the methods provided may be practiced in a variety of other environments. For example, the methods described may be applied to generalized cyber security. In such an implementation, incoming events may be provided by network analysis modules, firewall systems, anti-virus systems, spam detection systems, and/or any other system suitable for indicating network-related and/or computer-related events. Based on the behavior indicated by such events, the CEP and machine learning components could produce actions for policy enforcement points, routers, switches, and/or individual computing devices.

A CEP/machine learning system could also be applied to a tactical network. For input, the system could use tactical data link messages, radio status, tactical imagery and/or video, and/or link status information. CEP user policies could be used to maintain the best configuration of all radios and to predictively cache data to reduce latency for edge users. The machine learning could be used to fine-tune caching to ensure that data is moved most effectively.

Such systems may also be used for the internal network of a vehicle, such as an aircraft. The event sources may include, for example, sensors, radar, flight controls, and data-link messages. The system could be used to correlate data between multiple aircraft systems to determine if any abnormal situations exist. It could also be used as a protection mechanism for the internal aircraft network to ensure that subsystems in the aircraft are not compromised.

Embodiments described herein enable monitoring of a control system based on expected behavior represented by both a complex event processing (CEP) system (e.g., in the form of user policies) and a machine learning system (e.g., in the form of expected event correlations). Operating events associated with the control system are used to create an actual behavior of the control system, and this actual behavior is compared to both forms of expected behavior to determine whether the actual behavior is abnormal. Further, such events, including events from systems outside the control system itself, may be analyzed by a machine learning component to create an artificial intelligence (AI) event correlation model that represents expected behavior as correlations between operating events. Because it is based on operating events specific to the control system, the AI event correlation model may provide a customized model of expected behavior capable of detecting abnormalities that are not recognizable by generalized CEP policies.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in identifying abnormal behavior in a supervisory control and data acquisition (SCADA) system including a learning system, said method comprising:
   receiving, by a computing device, a plurality of operating events associated with the SCADA system, wherein the operating events represent at least one physical operating event;
   determining, by the computing device, an actual behavior of the SCADA system based on the operating events;
   dynamically identifying, by the learning system, at least one correlation between a plurality of past operating events stored in a past event database;
   creating an artificial intelligence (AI) event correlation model based on the at least one correlation identified by the learning system;
   comparing, by the computing device, the actual behavior of the SCADA system to the AI event correlation model to determine whether the actual behavior differs from the AI event correlation model;
   comparing, by the computing device and independent of said comparing the actual behavior of the SCADA system to the AI event correlation model, the actual behavior of the SCADA system to user policies using a complex event processing component;

receiving, by the computing device, an indication of whether the actual behavior is abnormal from a user when the actual behavior differs from the AI event correlation model; and updating, by the computing device, the AI event correlation model based on the received indication.

2. A method in accordance with claim 1, wherein the SCADA system is an instance of a class of the SCADA system, and comparing the actual behavior to the expected behavior comprises comparing the actual behavior to a plurality of event flows that are applicable to the class of the SCADA system.

3. A method in accordance with claim 1, further comprising updating the AI event correlation model to include the determined actual behavior when the user indicates the actual behavior is normal.

4. A method in accordance with claim 1, wherein the SCADA system is associated with a controlled apparatus, and receiving the plurality of operating events comprises:
  receiving an internal operating event from a control device that is configured to control an operation of the controlled apparatus; and
  receiving an external operating event from a monitoring device that is configured to monitor an operating environment associated with the controlled apparatus.

5. A method in accordance with claim 1, wherein the operating events are received at a first rate, said method further comprising receiving and logging the operating events at a second rate that is greater than the first rate when the actual behavior differs from the AI event correlation model.

6. A method in accordance with claim 1, wherein determining the actual behavior based on the operating events comprises determining the actual behavior based on at least one of a power consumption and a temperature.

7. A method in accordance with claim 1, wherein determining the actual behavior based on the operating events comprises determining the actual behavior based on a control message transmitted to a control device by a controller.

8. A system for use in identifying abnormal behavior in a supervisory control and data acquisition (SCADA) system, said system comprising:
  a learning system configured to dynamically identify at least one correlation between a plurality of past operating events stored in a past event database;
  a storage device configured to store an artificial intelligence (AI) event correlation model associated with the SCADA system, wherein the AI event correlation model is based on the at least one correlation identified by the learning system;
  a communications unit configured to receive a plurality of operating events representing at least one physical operating event associated with the SCADA system; and
  a processor unit coupled to said storage device and said communications unit, wherein said processor unit is programmed to:
    determine an actual behavior of the SCADA system based on the operating events;
    compare the actual behavior to the AI event correlation model to determine whether the actual behavior differs from the AI event correlation model; and
    compare, independent of said comparing the actual behavior to the AI event correlation model, the actual behavior to user policies using a complex processing component;
    update the AI event correlation model based on an indication from a user of whether the actual behavior is abnormal.

9. A system in accordance with claim 8, wherein said processor unit is programmed to compare the actual behavior to the AI event correlation model at least in part by comparing the actual behavior to a plurality of event flows that are applicable to the SCADA system.

10. A system in accordance with claim 8, wherein said communications unit is configured to receive a plurality of operating events at least in part by:
  receiving an internal operating event from a control device that is configured to control an operation of the controlled apparatus; and
  receiving an external operating event from a monitoring device that is configured to monitor an operating environment associated with the controlled apparatus.

11. A system in accordance with claim 8, wherein said communications unit is configured to receive a plurality of operating events at least in part by receiving at least one of a temperature, a sound pressure level, a structural load, and a vibration level.

12. A system in accordance with claim 8, wherein the SCADA system is located in a physical facility, and wherein said communications unit is configured to receive a plurality of operating events at least in part by receiving data representing a movement of a person within the physical facility.

13. A system in accordance with claim 8, wherein said communications unit is configured to receive a plurality of operating events at least in part by receiving an event from at least one of an intrusion detection system and an advanced persistent threat monitoring system.

14. A system in accordance with claim 8, wherein said processor unit is further programmed to determine whether the actual behavior differs from the AI event correlation model at least in part by comparing the actual behavior to an AI event correlation model that includes a correlation between a power consumption and a state of a controlled machine.

15. One or more non-transitory computer readable media having computer-executable components, said components comprising:
  an event processor component that when executed by at least one processor unit causes the at least one processor unit to:
    receive a plurality of operating events including one or more physical operating events associated with a supervisory control and data acquisition (SCADA) system;
  a complex event processing component that when executed by at least one processor unit causes the at least one processor unit to:
    compare an actual behavior that is based on the operating events to one or more user-defined policies to determine whether the actual behavior differs from the one or more use-defined policies; and
  a machine learning component that when executed by at least one processor unit causes the at least one processor unit to:
    dynamically identify at least one correlation between a plurality of past operating events stored in a past event database;
    compare, independent of the comparison made by the complex event processing component, the actual behavior to an artificial intelligence event correlation model that is generated based on the at least one identified correlation to determine whether the actual behavior differs from the AI event correlation model; and a decision support component that when executed by at least one processor unit causes the at least one processor unit to:
 transmit an abnormal behavior notification when the actual behavior differs from the AI event correlation model.

16. One or more non-transitory computer readable media in accordance with claim 15, wherein said decision support component further causes the at least one processor unit to execute a predetermined corrective action when the actual behavior is abnormal, wherein the corrective action includes at least one of isolating a portion of the SCADA system and disabling a portion of the SCADA system.

17. One or more non-transitory computer readable media in accordance with claim 15, wherein the SCADA system is located in a physical facility, and wherein said machine learning component further causes the at least one processor unit to create the artificial intelligence event correlation model based at least in part on past operating events representing a movement of a physical object within the physical facility.

* * * * *